United States Patent
Dai et al.

(10) Patent No.: US 10,944,096 B2
(45) Date of Patent: Mar. 9, 2021

(54) METHOD OF MANUFACTURING A LITHIUM METAL NEGATIVE ELECTRODE

(71) Applicant: GM GLOBAL TECHNOLOGY OPERATIONS LLC, Detroit, MI (US)

(72) Inventors: Fang Dai, Troy, MI (US); Hongliang Wang, Sterling Heights, MI (US); Wayne Cai, Troy, MI (US); Mei Cai, Bloomfield Hills, MI (US); Michael P. Balogh, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 15/949,609

(22) Filed: Apr. 10, 2018

(65) Prior Publication Data
US 2019/0312255 A1 Oct. 10, 2019

(51) Int. Cl.
| | | |
|---|---|---|
| *H01M 4/62* | (2006.01) | |
| *H01M 4/72* | (2006.01) | |
| *H01M 4/74* | (2006.01) | |
| *H01M 4/82* | (2006.01) | |
| *H01M 6/00* | (2006.01) | |
| *H01M 4/04* | (2006.01) | |

(Continued)

(52) U.S. Cl.
CPC .......... *H01M 4/0471* (2013.01); *B23K 26/22* (2013.01); *B23K 26/354* (2015.10); *H01M 4/043* (2013.01); *H01M 4/134* (2013.01); *H01M 4/1395* (2013.01); *H01M 4/382* (2013.01); *H01M 4/661* (2013.01); *H01M 10/052* (2013.01); *B23K 2101/36* (2018.08); *H01M 2004/027* (2013.01)

(58) Field of Classification Search
None
See application file for complete search history.

(56) References Cited

U.S. PATENT DOCUMENTS

| | | | | |
|---|---|---|---|---|
| 2002/0037457 A1* | 3/2002 | Choi | ............ | C22C 24/00 429/231.95 |
| 2010/0285353 A1* | 11/2010 | Katayama | ............ | H01M 2/26 429/185 |

(Continued)

OTHER PUBLICATIONS

Quintino et al., "Conduction laser welding", 2013, Woodhead Publishing Limited, pp. 139-162 (Year: 2013).*

(Continued)

*Primary Examiner* — Cynthia H Kelly
*Assistant Examiner* — Julian Anthony
(74) *Attorney, Agent, or Firm* — Quinn IP Law

(57) ABSTRACT

A negative electrode for an electrochemical cell of a lithium metal battery may be manufactured by welding together a lithium metal layer and a metallic current collector layer. The lithium metal layer and the current collector layer may be arranged adjacent one another and in an at least partially lapped configuration such that faying surfaces of the layers confront one another and establish a faying interface therebetween at a weld site. A laser beam may be directed at an outer surface of the current collector layer at the weld site to melt a portion of the lithium metal layer adjacent the faying surface of the current collector layer and produce a lithium metal molten weld pool. The laser beam may be terminated to solidify the molten weld pool into a solid weld joint that physically bonds the lithium metal layer and the current collector layer together at the weld site.

17 Claims, 8 Drawing Sheets

(51) Int. Cl.
  *H01M 4/66*     (2006.01)
  *H01M 4/38*     (2006.01)
  *H01M 4/134*    (2010.01)
  *H01M 10/052*   (2010.01)
  *B23K 26/22*    (2006.01)
  *B23K 26/354*   (2014.01)
  *H01M 4/1395*   (2010.01)
  *H01M 4/02*     (2006.01)
  *B23K 101/36*   (2006.01)

(56) References Cited

U.S. PATENT DOCUMENTS

2016/0211500 A1* 7/2016 Lee ................ B23K 26/0006
2017/0028515 A1* 2/2017 De Souza ........... B23K 26/702

OTHER PUBLICATIONS

Jiang et al., "Laser Welding under Vacuum: A Review", 2017, Appl. Sci., pp. 1-17. (Year: 2017).*

* cited by examiner

METHOD OF MANUFACTURING A LITHIUM METAL NEGATIVE ELECTRODE

A battery is a device that stores chemical energy and can convert its stored chemical energy into electrical energy on demand by means of electrochemical reduction-oxidation (redox) reactions. In secondary or rechargeable batteries, these electrochemical reactions are reversible, which allows the batteries to undergo multiple charging and discharging cycles.

An electrochemical cell of a secondary lithium battery generally includes a negative electrode and a positive electrode separated from each other by an ionically conductive (and electrically insulative) electrolyte. The electrolyte provides a medium through which lithium ions can be transferred between the electrodes during charging and discharging of the cell. Energy is stored in the negative and positive electrodes of the cell in the form of lithium, with the energy density of the cell determined by the lithium storage capacity of the electrodes per unit mass and the electrochemical potential difference of lithium between the negative electrode and the positive electrode. Lithium metal has a relatively low density and exhibits the most negative electrochemical potential of any element (relative to the standard hydrogen electrode), allowing for the highest possible electrochemical potential difference within an electrochemical cell and thus making it an ideal material for the negative electrode of a lithium battery.

In practice, the negative and positive electrodes in an electrochemical cell are each electrically coupled to an electrically conductive metallic current collector, which provide a medium through which electrons can travel from one electrode to the other via an external circuit. Therefore, the practical use of lithium metal as the negative electrode material of a lithium battery necessitates the development of a method that can be used to form a robust physical and electrical bond between a lithium metal layer and a metallic current collector, without adversely impacting the mechanical integrity of the lithium metal layer and without triggering any undesirable chemical reactions between the lithium metal layer and the surrounding environment.

SUMMARY

In a method of manufacturing a negative electrode for an electrochemical cell of a lithium metal battery, a lithium metal layer and a metallic current collector layer may be provided. The lithium metal layer may have a first side that defines an outer surface and an opposite second side that defines a faying surface, and the metallic current collector layer may have a first side that defines an outer surface and an opposite second side that defines a faying surface. The lithium metal layer and the current collector layer may be arranged adjacent one another and in an at least partially lapped configuration such that the faying surfaces of the layers confront one another and establish a faying interface therebetween at a weld site. The lithium metal layer and the current collector layer may be clamped between a support plate and a transparent top plate such that the first side of the lithium metal layer faces toward the support plate, the first side of the current collector layer faces toward the transparent top plate, and the faying surfaces of the layers press against each other at the weld site. A laser beam may be directed at the outer surface of the current collector layer at the weld site to melt a portion of the lithium metal layer adjacent the faying surface of the current collector layer and produce a lithium metal molten weld pool that wets the faying surface of the current collector layer. The laser beam may be terminated to solidify the molten weld pool into a solid weld joint that physically bonds the lithium metal layer and the current collector layer together at the weld site.

The metallic current collector layer may have a relatively high melting point, as compared to that of the lithium metal layer. In such case, the molten weld pool may be produced at the faying interface between the lithium metal layer and the current collector layer without penetrating or melting the faying surface of the current collector layer.

The laser beam may be operated in conduction welding mode so that the lithium metal molten weld pool partially penetrates the lithium metal layer and extends from the second side of the lithium metal layer partway to the first side of the lithium metal layer.

The metallic current collector layer may comprise at least one metal or metal alloy selected from the group consisting of copper, nickel, stainless steel, and titanium.

The metallic current collector layer may comprise a non-porous metallic foil, a perforated metallic sheet, or a porous metallic mesh.

The solid weld joint may be formed between the lithium metal layer and the current collector layer without use of a flux, filler, or solder material.

The laser beam may be a continuous wave laser beam having a power density in the range of $3\times10^4$ W/cm$^2$ to $1\times10^6$ W/cm$^2$, a velocity in the range of 0.2 m/s to 2 m/s, and a laser beam spot size in the range of 0.2 mm to 1 mm.

Prior to directing the laser beam at the outer surface of the current collector layer, the lithium metal layer and the current collector layer may be enclosed within a chamber and a subatmospheric pressure environment may be established within the chamber.

The chamber may include a transparent window. In such case, the laser beam may be transmitted through the transparent top plate and through the transparent window prior to being directed at the outer surface of the current collector layer.

Prior to arranging the lithium metal layer and the current collector layer adjacent one another and in an at least partially lapped configuration, the faying surface of the metallic current collector layer may be abraded to produce a plurality of peaks and valleys at the faying surface of the metallic current collector layer. In such case, when the laser beam is directed at the outer surface of the current collector layer, the lithium metal molten weld pool may flow into the valleys at the faying surface of the current collector layer. In addition, after termination of the laser beam, portions of the solid weld joint may extend into the valleys at the faying surface of the current collector layer and create a mechanical interlock that inhibits sliding movement of the current collector layer and the lithium metal layer relative to each other.

The faying surface of the metallic current collector layer may be abraded using a laser ablation process wherein a pulsed laser beam is directed at the faying surface of the current collector and advanced relative to a plane defined by faying surface of the current collector layer in accordance with a predefined travel path. The pulsed laser beam may exhibit a power density in the range of $5.0\times10^5$ W/cm$^2$ to $1.0\times10^7$ W/cm$^2$, a pulse duration in the range of 0.5 nanoseconds to 500 nanoseconds, a pulse repetition rate in the range of 1 kHz to 100 kHz, a velocity in the range of 0.1 m/s to 2 m/s, and a laser beam spot size in the range of 25 µm to 200 µm.

The laser ablation process may be performed in an oxygen-containing environment to form a metal oxide layer on the faying surface of the metallic current collector layer. In such case, when the laser beam is directed at the outer surface of the current collector layer, the lithium metal molten weld pool may chemically react with the metal oxide layer on the faying surface of the current collector layer to form one or more lithium oxide compounds. In addition, after termination of the laser beam, the solid weld joint may chemically and physically bond the lithium metal layer and the current collector layer together at the weld site.

The current collector layer may be porous and may includes a plurality of through-holes extending in a transverse direction relative to a plane defined by the faying surface of the current collector layer. In such case, when the laser beam is directed at the outer surface of the current collector layer, the lithium metal molten weld pool may flow into the through-holes in the current collector layer. In addition, after termination of the laser beam, portions of the solid weld joint may extend into the through-holes in the current collector layer and create a mechanical interlock that inhibits sliding movement of the current collector layer and the lithium metal layer relative to each other. The through-holes in the current collector layer have diameters greater than or equal to 0.5 millimeters.

In a method of manufacturing a negative electrode for an electrochemical cell of a lithium metal battery, a lithium metal layer and a metallic current collector layer may be provided. The lithium metal layer may have a first side that defines an outer surface and an opposite second side that defines a faying surface, and the metallic current collector layer may have a first side that defines an outer surface and an opposite second side that defines a faying surface. A pulsed laser beam may be directed at the faying surface of the metallic current collector layer while the current collector layer is exposed to an oxygen-containing environment to produce a plurality of peaks and valleys at the faying surface of the current collector layer and to form a thin metal oxide layer on the faying surface of the current collector layer. Thereafter, the lithium metal layer and the metallic current collector layer may be arranged adjacent one another and in an at least partially lapped configuration such that the faying surfaces of the layers confront one another and establish a faying interface therebetween at a weld site. The lithium metal layer and the current collector layer may be clamped between a support plate and a transparent top plate such that the first side of the lithium metal layer faces toward the support plate, the first side of the current collector layer faces toward the transparent top plate, and the faying surfaces of the layers press against each other at the weld site. A laser beam may be directed at the outer surface of the current collector layer at the weld site to melt a portion of the lithium metal layer adjacent the faying surface of the current collector layer and produce a lithium metal molten weld pool that wets the faying surface of the current collector layer, flows into the valleys at the faying surface of the current collector layer, and chemically reacts with the metal oxide layer on the faying surface of the current collector layer to form one or more lithium oxide compounds. Then, the laser beam may be terminated to solidify the molten weld pool into a solid weld joint that chemically and physically bonds the lithium metal layer and the current collector layer together at the weld site. Portions of the solid weld joint may extend into the valleys at the faying surface of the current collector layer and create a mechanical interlock that inhibits movement of the current collector layer and the lithium metal layer relative to each other.

The metallic current collector layer may comprise at least one metal or metal alloy selected from the group consisting of copper, nickel, iron, and titanium, and the metal oxide layer formed on the faying surface of the current collector layer may comprise an oxide of the at least one metal or metal alloy of the metallic current collector layer.

After the plurality of peaks and valleys are produced at the faying surface of the current collector layer, the faying surface of the current collector layer may exhibit a surface roughness (Rz) in the range of 10 micrometers to 500 micrometers, and the metal oxide layer formed on the faying surface of the current collector layer may exhibits a thickness in the range of 0.1 micrometers to 10 micrometers.

DETAILED DESCRIPTION

The presently disclosed laser welding process may be used to establish a robust physical bond along a zero-gap faying interface between a porous or non-porous metallic current collector layer and a lithium metal layer, while preserving the structural integrity of the layers and without the use of a flux, filler, or solder material. In some embodiments, a faying surface of the metallic current collector layer may be pretreated by a laser ablation process prior to the laser welding process to roughen the faying surface of the current collector layer and thereby improve the strength of the resulting physical bond formed between the current collector layer and the lithium metal layer during the laser welding process, for example, by creating a mechanical interlock between the layers. In one form, the laser ablation process may be performed in an oxygen-containing environment so that the faying surface of the metallic current collector layer is simultaneously roughened and oxidized during the laser ablation process to form a thin metal oxide layer on the faying surface of the metallic current collector layer. Thereafter, during the subsequent laser welding process, the metal oxide layer on the faying surface of the metallic current collector layer may assist in the formation of a relatively strong chemical bond between the current collector layer and the lithium metal layer, in addition to the physical bond and mechanical interlock formed between the layers.

The presently disclosed laser welding process and optional laser ablation process can be used to effectively bond the current collector layer and the lithium metal layer together without inhibiting the free flow of electrons therebetween. As such, after the current collector layer and the lithium metal layer have been laser welded together, the layers may be used as a negative electrode in an electrochemical cell of a lithium metal battery, with the lithium metal layer functioning as the negative electrode material of the electrochemical cell.

Figure 1:
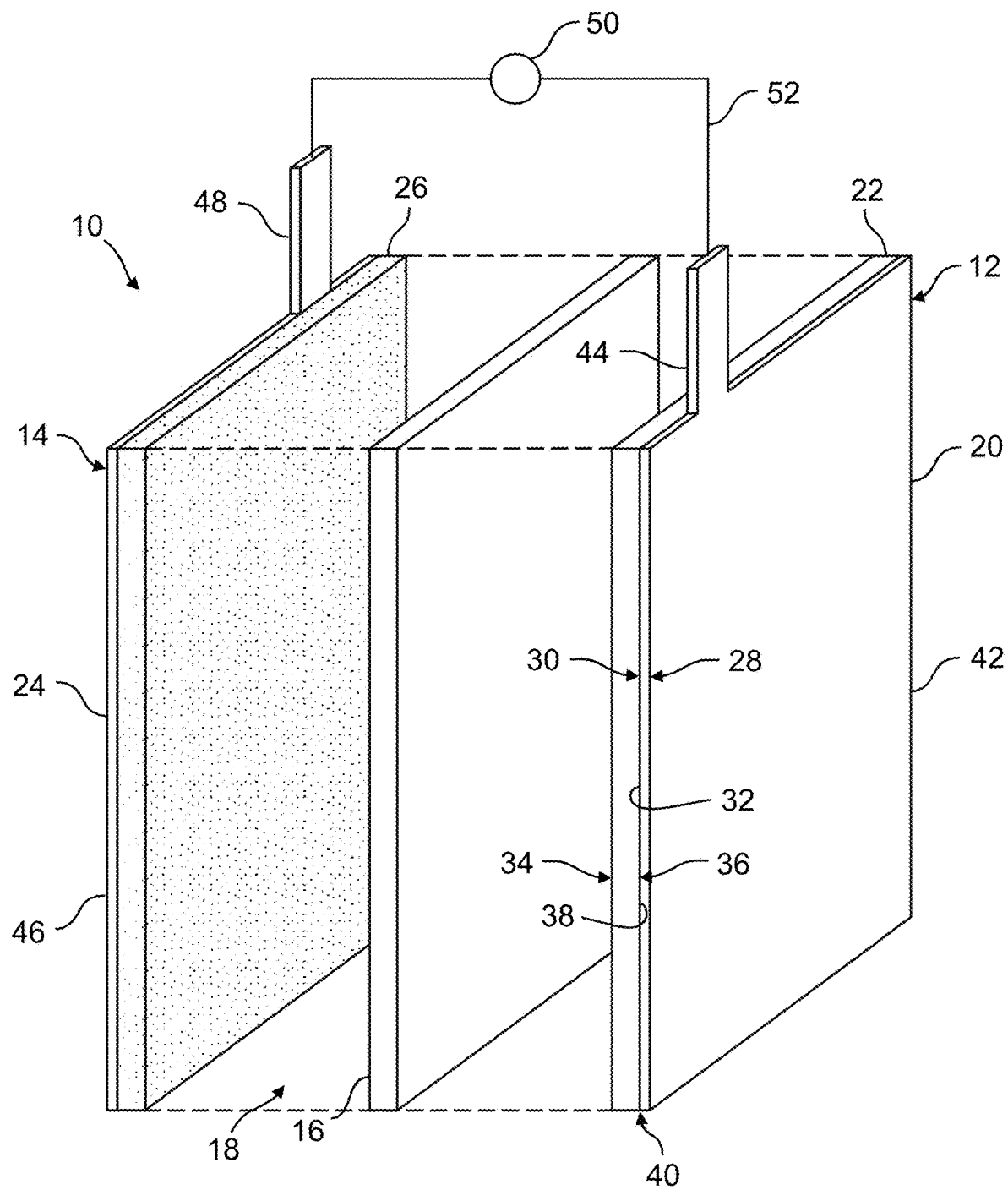
FIG. 1 is a schematic exploded perspective view of an electrochemical cell for a secondary lithium metal battery, the electrochemical cell including a negative electrode, a positive electrode, a porous separator sandwiched between the negative and positive electrodes, and a non-aqueous electrolyte in ionic contact with the positive and negative electrodes.

FIG. 1 illustrates in idealized fashion an exploded view of an electrochemical cell 10 for a secondary lithium metal battery (not shown) that includes a negative electrode 12, a positive electrode 14, a membrane 16 sandwiched between the negative and positive electrodes 12, 14, and a non-aqueous electrolyte 18 in ionic contact with the positive and negative electrodes 12, 14. The negative electrode 12 includes a negative electrode current collector 20 and a lithium metal negative electrode material layer 22 physically and electrically coupled to the negative electrode current collector 20. Likewise, the positive electrode 14 includes a positive electrode current collector 24 and an active positive electrode material layer 26 physically and electrically coupled to the positive electrode current collector 24.

The negative electrode current collector 20 includes a first side 28 and an opposite second side 30 that defines a faying surface 32, and, likewise, the lithium metal negative electrode material layer 22 includes a first side 34 and an opposite second side 36 that defines a faying surface 38. The negative electrode current collector 20 and the lithium metal negative electrode material layer 22 are mechanically, and, in some instances, chemically bonded to each other at a faying interface 40 established between their respective faying surfaces 32, 38 by one or more solid weld joints (not shown). The one or more weld joints formed at the faying interface 40 between the negative electrode current collector 20 and the lithium metal negative electrode material layer 22 may help maintain electrical contact therebetween during operation and/or movement of the electrochemical cell 10. For example, the one or more weld joints may help prevent delamination or separation between the lithium metal negative electrode material layer 22 and the negative electrode current collector 20 during bending or flexing of the electrochemical cell 10.

In FIG. 1, the negative electrode current collector 20 includes a body portion 42 that is coextensive with the lithium metal negative electrode material layer 22 and a negative polarity connection tab 44 that extends away from the body portion 42, beyond a periphery of the lithium metal negative electrode material layer 22. Likewise, the positive electrode current collector 24 includes a body portion 46 that is coextensive with the positive electrode material layer 26 and a positive polarity connection tab 48 that extends away from the body portion 46, beyond a periphery of the positive electrode material layer 26. However, in other embodiments, the body portions 42, 46 of the current collectors 20, 24 may be incommensurate with their respective electrode material layers 22. For example, the periphery of the negative electrode material layer 22 may be larger than a periphery of the body portion 42 of the negative electrode current collector 20 and/or the periphery of the positive electrode material layer 26 may be larger than a periphery of the body portion 46 of the positive electrode current collector 24. In one form, the body portion 42 of the negative electrode current collector 20 may sized to allow for the formation of one or more weld joints at the faying interface 40 between the negative electrode current collector 20 and the lithium metal negative electrode layer 22 so that a strong and a durable bond can effectively be formed therebetween.

The negative and positive polarity connection tabs 44, 48 may be of unitary one-piece construction with their respective negative and positive electrode current collectors 20, 24. Or, the negative and positive polarity connection tabs 44, 48 may be manufactured separated and subsequently coupled to their respective negative and positive electrode current collectors 20, 24, for example, by being welded thereto. In practice, the negative and positive polarity connection tabs 44, 48 of the electrochemical cell 10 may be electrically connected to corresponding negative and positive polarity connection tabs of one or more other electrochemical cells (not shown) to produce a lithium metal battery (not shown). The negative and positive polarity connection tabs 44, 48 also may be electrically connected to an electrical device 50 via an interruptible external circuit 52. The electrical device 50 may comprise an electrical load device, which may be powered by the electrochemical cell 10, or a power source, which may re-charge the electrochemical cell 10 through an applied external voltage.

The negative and positive electrode current collectors 20, 24 may comprise any metallic material that is capable of collecting and reversibly passing free electrons to and from their respective electrode material layers 22, 26. The term "metallic," as used herein refers to a material that predominantly comprises one or more metals. As such, a metallic material may comprise a single metal, more than one metal (in alloy form or otherwise), or both one or more metals and one or more other non-metal components in elemental or compound form. For example, the negative and/or positive electrode current collectors 20, 24 may comprise an electrically conductive metal or metal alloy, e.g., a transition metal or an alloy thereof. In some specific examples, the negative electrode current collector 20 may comprise copper, nickel, an iron alloy (e.g., stainless steel), or titanium, and the positive electrode current collector 24 may comprise aluminum, nickel, or an iron alloy (e.g., stainless steel). Other electrically conductive metals may of course be used, if desired. The negative and positive electrode current collectors 20, 24 each may be in the form of a thin and flexible non-porous metallic foil, a porous metallic mesh, or a perforated metallic sheet. The specific configuration of the negative and positive electrode current collectors 20, 24 may depend upon the intended application of the electrochemical cell 10. The negative and positive electrode current collectors 20, 24 may have thicknesses in the range of 8 micrometers to 150 micrometers.

The lithium metal negative electrode material layer 22 may consist essentially of lithium (Li) metal. For example, the lithium metal negative electrode material layer 22 may comprise, by weight, greater than 97% lithium or, more preferably, greater than 99% lithium. However, the negative electrode material layer 22 preferably does not comprise any other elements or compounds that undergo a reversible redox reaction with lithium during operation of the electrochemical cell 10. For example, the negative electrode material layer 22 preferably does not comprise an intercalation host material that is formulated to undergo the reversible insertion or intercalation of lithium ions or an alloying material that can electrochemically alloy and form compound phases with lithium. In addition, the negative electrode material layer 22 preferably does not comprise a conversion material or an alloy material that can electrochemically alloy and form compound phases with lithium. Some examples of materials that are preferably excluded from the negative electrode material layer 22 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybedenum oxide), metal phosphides, metal sulfides, and metal nitrides (e.g., phosphides, sulfides, and/or nitrides or iron, manganese, nickel, copper, and/or cobalt). In addition, the negative electrode material layer 22 preferably does not comprise a polymeric binder. Some examples of polymeric binders that are preferably excluded from the negative electrode material layer 22 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The lithium metal negative electrode material layer 22 may be in the form of a thin and flexible non-porous metal foil or sheet. The specific configuration of the negative electrode material layer 22 may depend upon the intended application of the electrochemical cell 10. The lithium metal negative electrode material layer 22 may have a thickness in the range of 5 micrometers to 600 micrometers.

The positive electrode material layer 26 may comprise one or more electrochemically active materials that can undergo a reversible redox reaction with lithium at a higher electrochemical potential than the material of the negative electrode material layer 22 such that an electrochemical potential difference exists between the electrode material layers 22, 26, as is well known in the art. The membrane 16 may comprise any organic or inorganic material that can physically separate and electrically insulate the negative and positive electrode material layers 22, 26 from each other while permitting the free flow of lithium ions therebetween. The non-aqueous electrolyte 18 may comprise any material that is capable of effectively conducting lithium ions through the membrane 16 and between the negative and positive electrode material layers 22, 26. In some embodiments, the membrane 16 may be eliminated from the electrochemical cell 10, for example, in embodiments where the electrolyte 18 can physically separate and electrically insulate the negative and positive electrode material layers 22, 26 from each other, while also conducting lithium ions between the negative and positive electrode material layers 22, 26. Exemplary materials for the positive electrode material layer 26, the optional membrane 16, and the electrolyte 18 are well known in the art.

Figure 2:
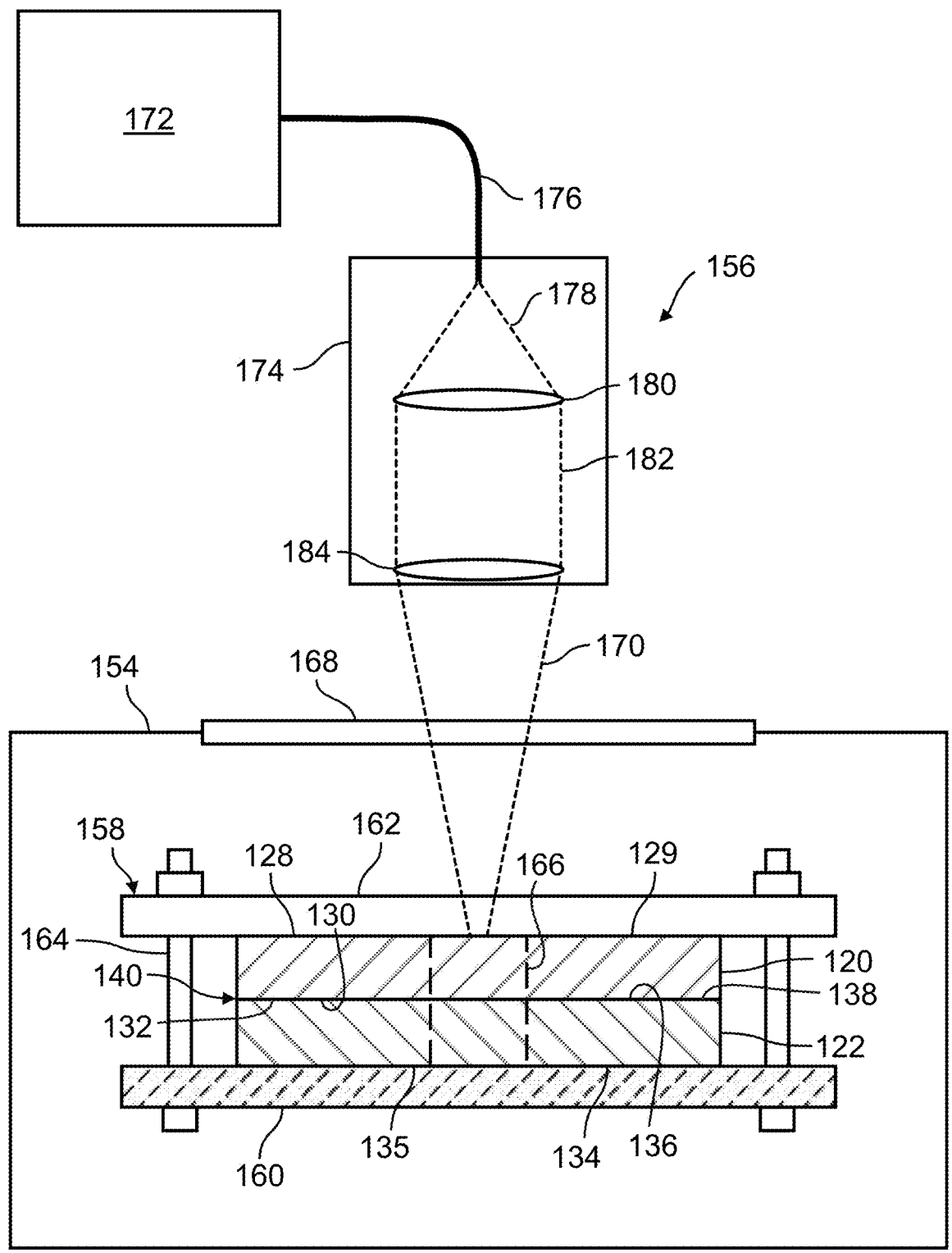
FIG. 2 is a schematic side cross-sectional view of a system for manufacturing a negative electrode for an electrochemical cell of a lithium metal battery, the system including a laser welding apparatus and an enclosed chamber in which a metallic current collector layer and a lithium metal layer are arranged in an at least partially lapped configuration.

Referring now to FIG. 2, the negative electrode 12 may be manufactured via a laser welding process in which a metallic current collector layer 120 and a lithium metal layer 122 are provided, positioned within a chamber 154, and welded together using a laser welding apparatus 156. The laser welding process described herein allows the current collector layer 120 and the lithium metal layer 122 to be joined together without physically contacting the layers 120, 122 and without exposing the layers 120, 122 to contamination. In addition, the presently disclosed laser welding process allows the layers 120, 122 to be joined together while only having access to the first side 128 of the current collector layer 120. In the embodiment depicted in FIG. 2, the current collector layer 120 and the lithium metal layer 122 are in the form of thin and flexible non-porous foils. However, in other embodiments, the current collector layer 120 may be in the form of a porous metallic mesh or a perforated metallic sheet.

The lithium metal layer 122 may be made of the same material as that of the negative electrode material layer 22 and the current collector layer 120 may be made of the same material as that of the negative electrode current collector 20. The material of the lithium metal layer 122 has a relatively low melting point, as compared to the melting point of the material of the current collector layer 120. For example, in embodiments where the lithium metal layer 122 comprises lithium, the layer 122 may have a melting point of about 180.5° C. In embodiments where the current collector layer 120 comprises copper, the layer 120 may have a melting point of about 1085° C. In embodiments where the current collector layer 120 comprises nickel, the layer 120 may have a melting point of about 1455° C. In embodiments where the current collector layer 120 comprises an iron alloy, the layer 120 may have a melting point in the range of about 1300° C. to 1500° C. In embodiments where the current collector layer 120 comprises titanium, the layer 120 may have a melting point of about 1668° C.

The current collector layer 120 may include a first side 128 defining an outer surface 129 and an opposite second side 130 that defines a faying surface 132, and, likewise, the lithium metal layer 122 may include a first side 134 defining an outer surface 135 and an opposite second side 136 that defines a faying surface 138. The current collector layer 120 and the lithium metal layer 122 may be positioned adjacent one another in an at least partially lapped configuration within the chamber 154 such that the faying surfaces 132, 138 of the layers 120, 122 come together to establish a faying interface 140 therebetween.

The current collector layer 120 and the lithium metal layer 122 may be supported within the chamber 154 by a clamp 158, which may include a support plate 160, a transparent top plate 162, and one or more adjustable arms 164, which may allow for adjustment of the position of the top plate 162 relative to the support plate 160. The transparent top plate 162 may comprise any material through which a laser beam can be effectively transmitted, for example, the top plate 162 may comprise a silica-based glass, e.g., fused silica or quartz. In one form, the top plate 162 may have a thickness in the range of 1 millimeter to 5 millimeters. The support plate 160 may comprise any material that is non-reactive with lithium, e.g., stainless steel. The current collector layer 120 and the lithium metal layer 122 may be positioned within the chamber 154 such that the first side 134 of the lithium metal layer 122 faces toward the support plate 160 and the first side 128 of the current collector layer 120 faces toward the transparent top plate 162. The transparent top plate 162 and the support plate 160 may be brought together by the one or more adjustable arms 164 so that the top plate 162 presses against the outer surface 129 on the first side 128 of the current collector layer 120 and the support plate 160 presses against the outer surface 135 on the first side 134 of the lithium metal layer 122 to bring the faying surfaces 132, 138 of the layers 120, 122 into intimate contact with each other at an intended weld site 166. During the laser welding process, the force exerted on the outer surfaces 129, 135 of the layers 120, 122 by the plates 160, 162 may be in the range of 40 newtons to 400 newtons.

A subatmospheric pressure environment (e.g., less than 1 atmosphere) or an inert gas environment may be created within the chamber 154 during the laser welding process to prevent contamination and/or to prevent undesirable chemical reactions (e.g., oxidation and/or lithium combustion) from occurring between the environment in the chamber 154 and the lithium metal layer 122 and/or the current collector layer 120. If an inert gas environment is employed, a stream of an inert gas (e.g., argon) may be directed through the chamber 154 during the laser welding process. The chamber 154 may include a transparent window 168 through which a laser beam 170 can be transmitted so that the laser beam 170 can pass from an exterior to an interior of the chamber 154 and onto the current collector layer 120 during the laser welding process. The transparent window 168 may comprise any material through which the laser beam 170 can be effectively transmitted, for example, the window 168 may comprise a silica-based glass, e.g., fused silica or quartz.

The laser welding apparatus 156 may include a laser beam generator 172 and a laser scanning head 174 (also referred to as a scan head) coupled to the laser beam generator 172 by a fiber optic cable 176. A diverging laser beam 178 may be delivered from the laser beam generator 172 via the fiber optic cable 176 to the scanning head 174, where the diverging laser beam 178 may pass through a collimating lens 180 that transforms the diverging laser beam 178 into a collimated laser beam 182 having a constant beam diameter. Then, the collimated laser beam 182 may pass through a scanning lens 184 (e.g., an f-theta lens) that focusses the laser beam 170 into a desired beam spot size at a focal plane of the laser beam 170 and directs the laser beam 170 onto a target area on the outer surface 129 of the current collector layer 120 at the intended weld site 166. The scanning head 174 also may include moveable mirrors (not shown), e.g., galvanometer mirrors, that can precisely and rapidly move the laser beam 170 relative to a plane oriented along the outer surface 129 of the current collector layer 120 without moving the scanning head 174. During the laser welding process, the laser beam 170 may exhibit a power density in the range of $3 \times 10^4$ W/cm$^2$ to $1 \times 10^6$ W/cm$^2$, a velocity in the range of 0.2 meters per second to 2 meters per second, and a laser beam spot size in the range of 0.2 millimeters to 1 millimeter. The laser beam 170 may be a continuous wave or a pulsed laser beam.

During the laser welding process, the current collector layer 120 and the lithium metal layer 122 are positioned adjacent one another in an at least partially lapped configuration within the chamber 154, with the faying surfaces 132, 138 of the layers 120, 122 pressed against each other at the weld site 166. Thereafter, the laser beam 170 is directed and transmitted through the window 168, through the top plate 162, and onto the outer surface 129 of the current collector layer 120 so that the laser beam 170 impinges the outer surface 129 of the current collector layer 120 at the weld site 166. Heat is generated in the current collector layer 120 at the weld site 166 by absorption of energy from the impinging laser beam 170 and is transferred from the current collector layer 120 to the lithium metal layer 122 by conduction, which initiates melting of the lithium metal layer 122 along the faying surface 138 thereof. Unlike the lithium metal layer 122, the current collector layer 120 does not melt along its faying surface 132 during the laser welding process due to the relatively high melting point of the layer 120, as compared to that of the lithium metal layer 122.

Figure 3:
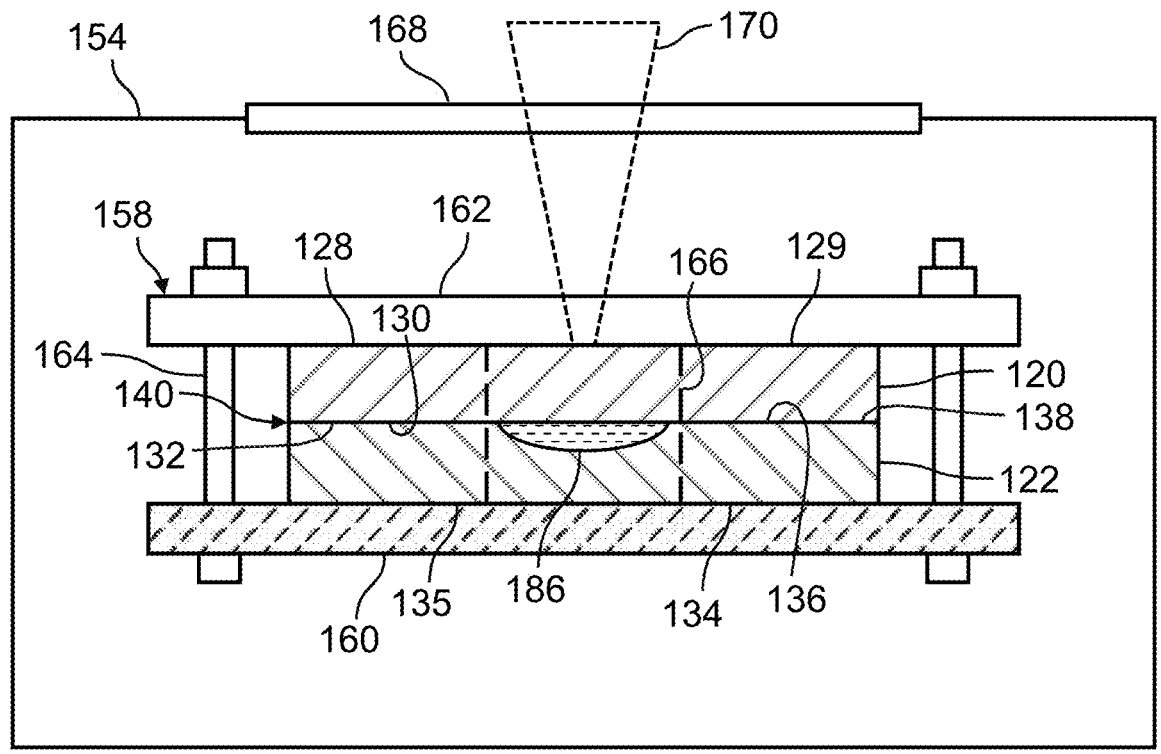
FIG. 3 is a schematic side cross-sectional view of the chamber of FIG. 2 illustrating a step in a laser welding process for joining the current collector layer and the lithium metal layer together, wherein a lithium metal molten weld pool is formed at a faying interface between the layers that penetrates partway into the lithium metal layer.

Referring now to FIG. 3, the laser beam 170 impinges the outer surface 129 on the first side 128 of the current collector layer 120 and the heat generated by absorption of energy from the laser beam 170 is conducted through the layers 120, 122 and creates a lithium metal molten weld pool 186 that partially penetrates the lithium metal layer 122 and extends from the second side 136 of the lithium metal layer 122 partway to the first side 134 of the lithium metal layer 122. The power density of the laser beam 170 is controlled so that the laser welding process is carried out in conduction welding mode so that the molten weld pool 186 does not fully penetrate the lithium metal layer 122, i.e., does not extend through an entire thickness of the lithium metal layer 122. The molten lithium metal from the molten weld pool 186 wets the faying surface 132 of the current collector layer 120, but does not melt or penetrate the faying surface 132 of the current collector layer 120 due to the relatively high melting point of the layer 120, as compared to that of the layer 122. The power level, travel velocity, laser beam spot size, and/or focal position of the laser beam 170 (focused at, below, or above the outer surface 129 of the layer 120) may be controlled during the laser welding process to control the depth and width of the molten weld pool 186.

Figure 4:
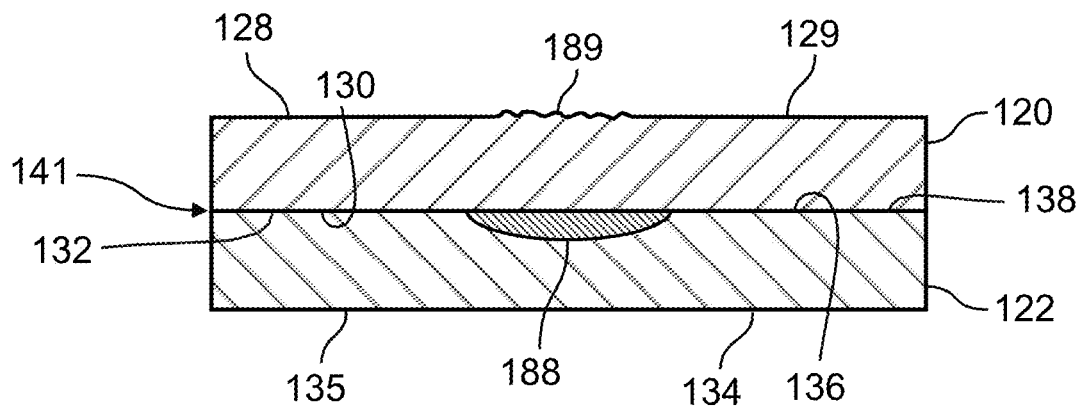
FIG. 4 is a schematic side cross-sectional view of the current collector layer and the lithium metal layer of FIG. 3 after solidification of the molten weld pool, wherein the current collector layer and the lithium metal layer are joined together by a solid weld joint.
Figure 5:
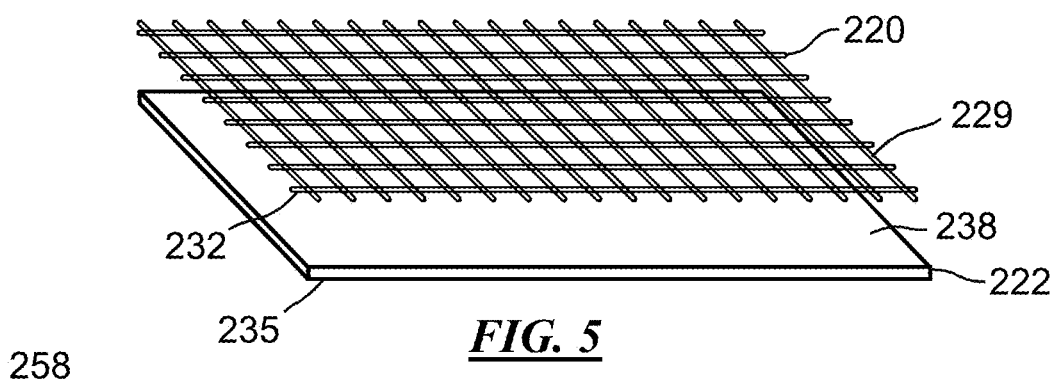
FIG. 5 is a schematic perspective view of a non-porous lithium metal layer and a metallic current collector layer in the form of a porous metallic mesh for use in the manufacture of a negative electrode for an electrochemical cell of a lithium metal battery, in accordance with one embodiment of the present disclosure.

As shown in FIG. 4, when the laser beam 170 is terminated, the lithium metal molten weld pool 186 rapidly cools and solidifies into a solid weld joint 188 at the faying interface 140 of the current collector layer 120 and the lithium metal layer 122. The resulting weld joint 188 physically bonds the current collector layer 120 and the lithium metal layer 122 together at the weld site 166. The weld joint 188 is formed without addition of a flux, filler, or solder material between the layers 120, 122 at any point prior to or during the laser welding process. As shown, a continuous zero-gap interface may exist between the layers 120, 122 after formation of the weld joint 188. The weld joint 188 depicted in FIG. 4 is schematic in nature and may or may not be representative of the actual size and shape of the weld joint formed in practice, which may vary depending on the size and shape of the current collector layer 120 and/or the lithium metal layer 122 as well as the size and shape of the travel path followed by the laser beam 170 during the welding process. In addition, as shown in FIG. 4, after the laser beam 170 is terminated, a region 189 on the first side 128 of the current collector layer 120 at the weld site 166 may exhibit a relatively rough or jagged contour, as compared to the outer surface 129 of the current collector layer 120 surrounding the weld site 166, which may be relatively smooth. For example, after the laser beam 170 is terminated, the region 189 may exhibit a surface roughness (Rz) in the range of 10-200 μm. The relatively rough contour of the region 189 on the first side 128 of the current collector layer 120 at the weld site 166 after completion of the laser welding process may be due to absorption of energy from the impinging laser beam 170 during the laser welding process.

For simplicity, only a single weld site 166 is depicted in FIGS. 2 and 3 and only a single weld joint 188 is depicted in FIG. 4; however, in practice, laser welding may be performed at multiple different weld sites within an overlapping region of the layers 120, 122. For example, the current collector layer 120 and the lithium metal layer 122 may be welded together using one or more discrete "spot" welds and/or one or more "seam" welds. A spot weld may be formed by focusing the laser beam 170 on the outer surface 129 of the current collector layer 120 at an intended weld site, and then terminating the laser beam 170 without moving the beam 170 or the layer 120 relative to each other. A seam weld may be formed by directing the laser beam 170 at the outer surface 129 of the current collector layer 120, and then advancing the laser beam 170 along a predefined travel path relative to the outer surface 129 of the current collector layer 120. The predefined travel path tracked by the laser beam 170 may be linear, curved, circular, elliptical, semi-circular, semi-elliptical, spiral-shaped, and/or oscillating.

FIGS. 5-9 depict another embodiment of a method of manufacturing a negative electrode, wherein a metallic current collector layer 220 in the form of a porous metallic mesh or a perforated metallic sheet is bonded to a lithium metal layer 222 via a laser welding process. As shown, the current collector layer 220 is porous and includes a plurality of through-holes 219, extending from an outer surface 229 to a faying surface 232 thereof in a transverse direction relative to a plane defined by the faying surface 232 of the current collector layer 220. The through-holes 219 may be separated from one another by one or more interconnected solid regions 221. The through-holes 219 may have diameters of greater than or equal to 0.5 millimeters. The interconnected solid regions 221 may have widths equal to or greater than the size of a beam spot 271 of the laser beam 270 (FIG. 7) on the outer surface 229 of the current collector layer 220. For example, the interconnected solid regions 221 may have widths equal to or greater than 200 μm. The through-holes 219 depicted in FIGS. 5-7 exhibit a generally square cross-sectional shape; however, the cross-sectional shape of the through-holes 219 is not limited thereto. For example, in other embodiments, the through-holes 219 in the current collector layer 220 may exhibit circular, triangular, rectangular, or hexagonal cross-sectional shapes, to name a few.

The embodiment depicted in FIGS. 5-9 is similar in many respects to the embodiment depicted in FIGS. 2-4, and like numerals between the embodiments generally designate like or corresponding elements throughout the several views of the drawing figures. The descriptions of the embodiments are incorporated by reference into one another and the common subject matter generally may not be repeated here.

Figure 6:
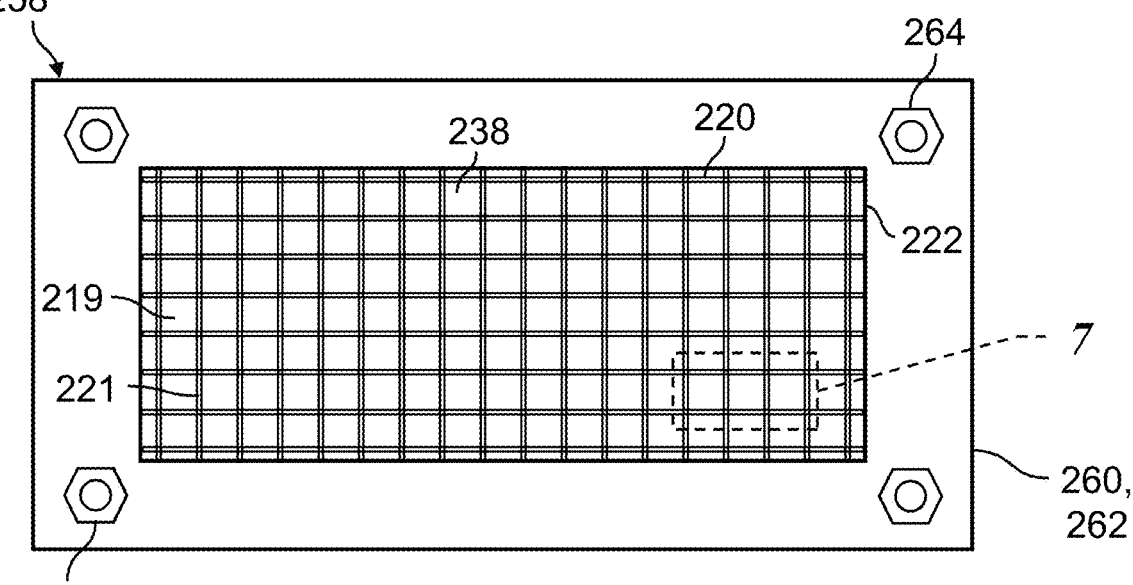
FIG. 6 is an overhead view of the lithium metal layer and the current collector layer of FIG. 5, with the lithium metal layer and the current collector layer arranged in a lapped configuration and clamped between a support plate and a transparent top plate.
Figure 8:
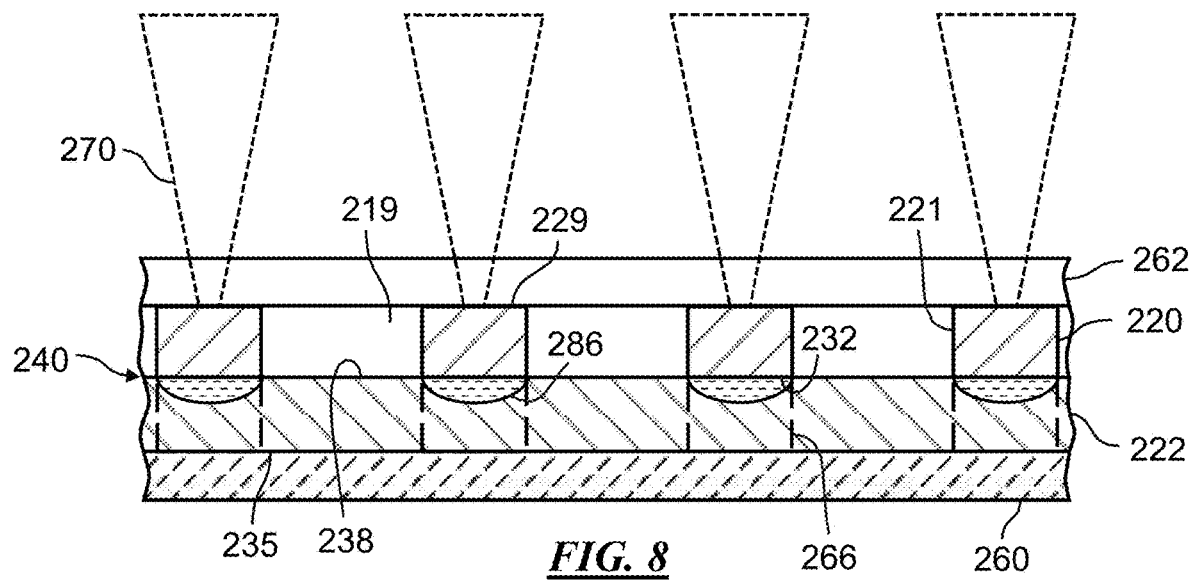
FIG. 8 is a schematic side cross-sectional view of the lithium metal layer and the current collector layer of FIG. 7 taken along line 8-8 of FIG. 7.

As best shown in FIGS. 6 and 8, prior to initiating the laser welding process, the current collector layer 220 and the lithium metal layer 222 are stacked one on top of the other between a support plate 260 and a transparent top plate 262 of a clamp 258. The current collector layer 220 and the lithium metal layer 222 are arranged between the support plate 260 and the top plate 262 of the clamp 258 such that the outer surface 229 of the current collector layer 220 presses against the top plate 262 and an outer surface 235 of the lithium metal layer 222 presses against the support plate 260. In addition, the faying surface 232 of the current collector layer 220 and a faying surface 238 of the lithium metal layer 222 come together to establish a faying interface 240 therebetween at an intended weld site 266. The faying surfaces 232, 238 of the layers 220, 222 are brought into intimate contact with each other at the weld site 266 by suitable adjustment of one or more adjustable arms 264, which can be used to control the distance between the plates 260, 262 and the pressure exerted on the outer surfaces 229, 235 of the respective layers 220, 222. Like the embodiment depicted in FIGS. 2-4, the layers 220, 222 and the clamp 258 may be positioned within a chamber (not shown) and subjected to a subatmospheric pressure environment and/or an inert gas environment during the laser welding process.

Figure 7:
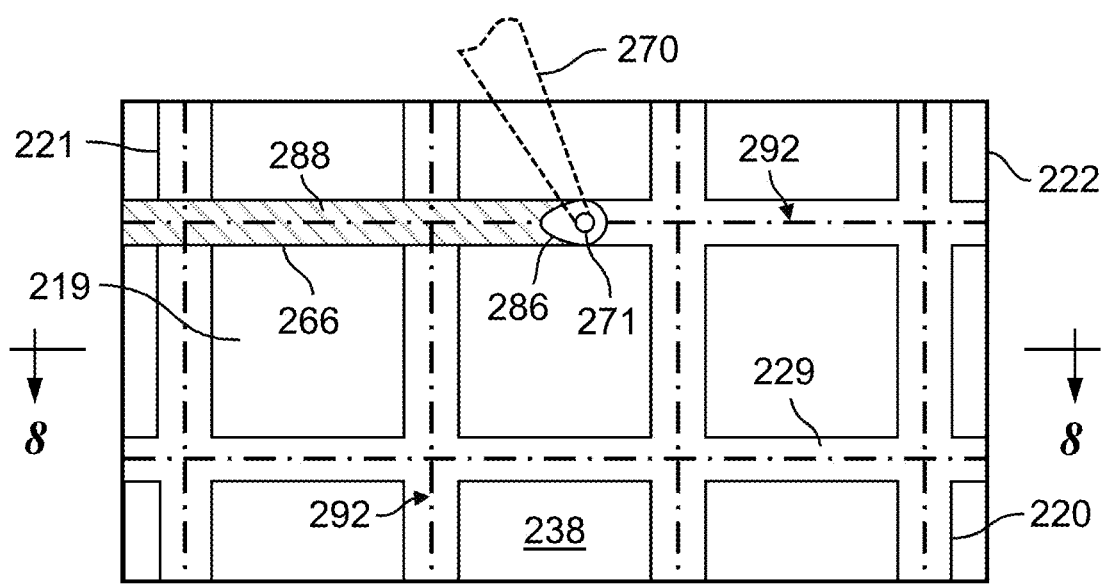
FIG. 7 is an enlarged view of the lithium metal layer and the current collector layer of FIG. 6 during a laser welding process, wherein a laser beam is advanced relative to an outer surface of the current collector layer along a predefined travel path at an intended weld site, in accordance with one embodiment of the present disclosure.
Figure 9:
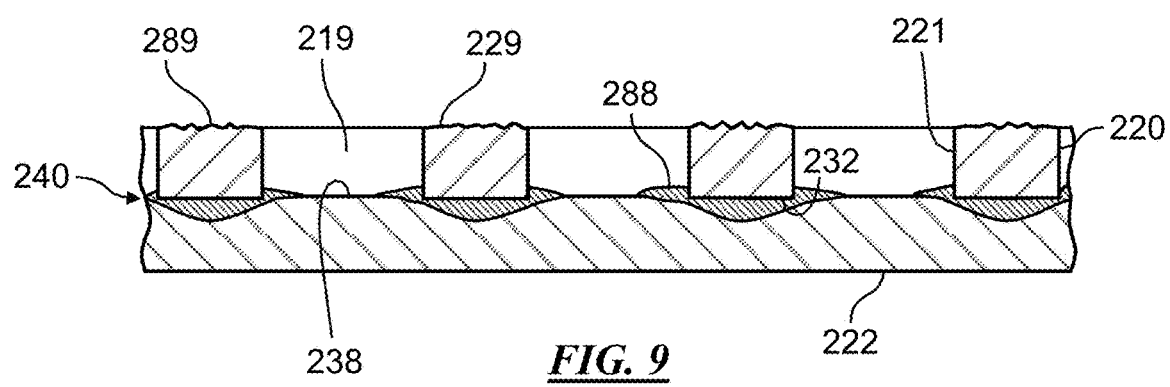
FIG. 9 is a schematic side cross-sectional view of the lithium metal layer and the current collector layer of FIG. 8 after completion of the laser welding process.

Referring now to FIGS. 7 and 8, after the layers 220, 222 are clamped between the plates 260, 262 and positioned within the chamber, the laser beam 270 is transmitted through the top plate 262 (and through a window in the chamber) and directed onto the outer surface 229 of the one or more solid regions 221 of the current collector layer 220 at the weld site 266. A lithium metal molten weld pool 286 is created along the faying interface 240 between the one or more solid regions 221 of the current collector layer 220 and the lithium metal layer 222 by absorption of energy from the laser beam 270. Thereafter, the laser beam 270 may be advanced relative to a plane oriented along the outer surface 229 of the current collector layer 220 in accordance with a predefined travel path 292, as best shown in FIG. 7. The travel path 292 may be configured so that the laser beam 270 tracks the one or more solid regions 221 of the current collector layer 220 and is not directed at the through-holes 219 in the layer 220. As the laser beam 270 advances along the travel path 292, the molten weld pool 286 follows. As best shown in FIGS. 7 and 9, molten lithium metal left behind in the wake of the weld pool 286 quickly cools and solidifies into a solid weld joint 288 that physically bonds the layers 220, 222 together at the weld site 266 and results in the formation of a zero-gap interface between the layers 220, 222. After the laser beam 270 is terminated, a region 289 on the outer surface 229 of the current collector layer 220 may exhibit a relatively rough or jagged contour, as compared to the outer surface 229 of the current collector layer 220 prior to the laser welding process. Depending on the configuration of the current collector layer 220, the travel path 292 tracked by the laser beam 270 may be continuous and may result in the formation of a single solid weld joint 288 at the faying interface 240, or the travel path 292 may be discontinuous and may result in the formation of multiple solid weld joints (not shown), which may be spaced apart from one another or interconnected.

Due to the pressure exerted on the outer surfaces 229, 235 of the layers 220, 222 by the plates 260, 262, the faying surface 232 defined by the one or more solid regions 221 of the current collector layer 220 may press against and into the molten weld pool 286 formed at the faying interface 240 during the laser welding process. In such case, molten lithium metal from the molten weld pool 286 may be squeezed out and away from the faying interface 240 between the layers 220, 222 and into the through-holes 219 between the one or more solid regions 221 of the current collector layer 220. As shown in FIG. 9, after the laser beam 270 is terminated, the lithium metal molten weld pool 286 rapidly solidifies into a solid weld joint 288 that physically bonds the layers 220, 222 together at the weld site 266. In addition, in this embodiment, the solid weld joint 288 is not only formed at the faying interface 240 of the layers 220, 222, but also extends into the through-holes 219, between and/or around a periphery of the one or more solid regions 221 of the current collector layer 220, and at least partially over the faying surface 238 of the lithium metal layer 222. The portions of the solid weld joint 288 that extend into the through-holes 219 and between and/or around a periphery of the one or more solid regions 221 of the current collector layer 220 may create a mechanical interlock between the layers 220, 222 that effectively inhibits or prevents relative movement of the layers 220, 222 with respect to each other. For example, the portions of the solid weld joint 288 that extend into the through-holes 219 may create a mechanical interlock between the layers 220, 222 that effectively increases the shear strength of the resulting physical bond between the layers 220, 222 by inhibiting or preventing the current collector layer 220 and the lithium metal layer 222 from sliding relative to each other along a plane defined by the faying surface 238 of the lithium metal layer 222.

FIGS. 10-13 depict another embodiment of a method of manufacturing a negative electrode, wherein a faying surface 332 of a metallic current collector layer 320 is pretreated by a laser ablation process prior to being bonded to a faying surface 238 of a lithium metal layer 322 via a laser welding process. The embodiment depicted in FIGS. 10-13 is similar in many respects to the embodiments depicted in FIGS. 2-9, and like numerals between the embodiments generally designate like or corresponding elements throughout the several views of the drawing figures. The descriptions of the embodiments are incorporated by reference into one another and the common subject matter generally may not be repeated here.

Figure 10:
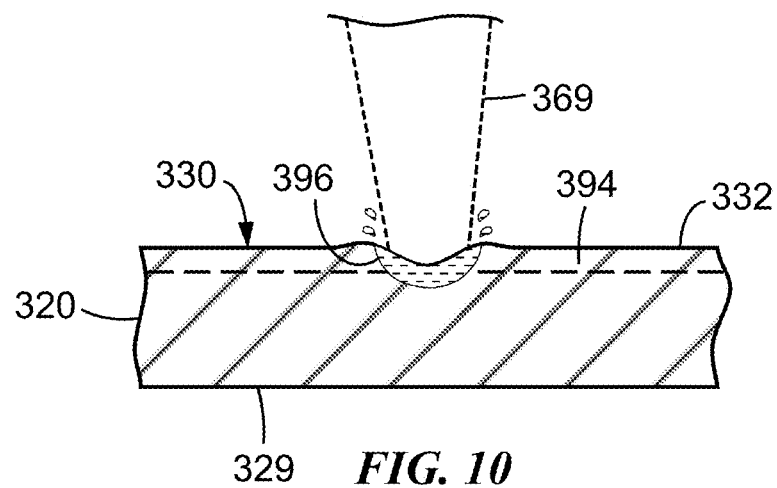
FIG. 10 is a schematic side cross-sectional view of a metallic current collector layer during a laser ablation pretreatment process, in which a pulsed laser beam is used to pretreat a surface of the current collector layer by removing material from a surface portion of the current collector layer.
Figure 11:
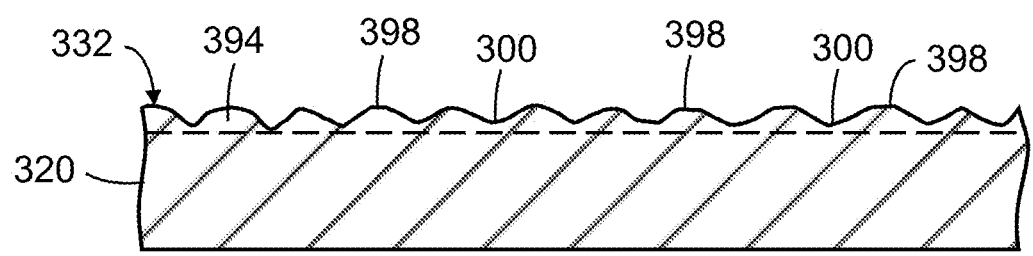
FIG. 11 is a schematic side cross-sectional view of the metallic current collector layer of FIG. 10 after completion of the laser ablation pretreatment process illustrating the contours of the surface of the current collector layer after completion of the laser ablation pretreatment process.

Referring now to FIGS. 10 and 11, the faying surface 332 of the current collector layer 320 may be pretreated using a laser ablation process, which may abrade or roughen the faying surface 332 on a second side 330 of the current collector layer 320 by removing material from a surface portion 394 thereof. During the laser ablation process, a pulsed laser beam 369 may be directed at the faying surface 332 of the layer 320 so that the pulses of the laser beam 369 repeatedly impinge the faying surface 332 of the layer 320. Heat generated at the point where each pulse of the laser beam 369 meets the faying surface 332 of the layer 320 may produce a three-dimensional pool of molten material 396 within the layer 320 that extends partway through the layer 320, from the faying surface 332 toward an outer surface 329 thereof. Depending upon the power density of the pulsed laser beam 369, material may be removed from the surface portion 394 of the layer 320 by vaporizing the material and/or by ejecting the material from the pool of molten material 396.

The pulsed laser beam 369 employed during the laser ablation process may exhibit a power density in the range of $5.0 \times 10^5$ W/cm$^2$ to $1.0 \times 10^7$ W/cm$^2$. In addition, the pulsed laser beam 369 may exhibit a pulse duration in the range of 0.5-500 nanoseconds, a pulse repetition rate in the range of 1-100 kHz, and a velocity in the range of 0.1-2 meters per second. In one form, the laser beam 369 may exhibit a pulse duration of about 200 nanoseconds, a pulse repetition rate of about 20 kHz, and a velocity of about 0.5 meters per second.

During the laser ablation process, the pulsed laser beam 369 may be advanced relative a plane oriented along the faying surface 332 of the current collector layer 320 in accordance with a predefined travel path (not shown). In one form, the travel path of the laser beam 369 may be configured so that the entire surface area of the faying surface 332 of the current collector layer 320 is exposed to the pulsed laser beam 369 during the laser ablation process. In another form, the travel path of the laser beam 369 may be configured so that at least one area on the faying surface 332 of the current collector layer 320 is not be exposed to the pulsed laser beam 369 during the laser ablation process. Depending upon the desired surface attributes, the area covered by each pulse of the pulsed laser beam 369 may or may not overlap the area covered by another previous or subsequent pulse of the laser beam 369. In one form, each pulse of the laser beam 369 may produce a beam spot on the faying surface 332 of the current collector layer 320 with a diameter in the range of 25 μm to 200 μm.

As shown best in FIG. 11, after completion of the laser ablation process, the faying surface 332 of the current collector layer 320 may exhibit a plurality of peaks 398 and valleys 300. In one form, the faying surface 332 of the current collector layer 320 may exhibit a surface roughness (Rz) in the range of 10 micrometers to 500 micrometers, or more preferably in the range of 20 micrometers to 200 micrometers, after completion of the laser ablation process. As such, as measured from a mean line at the faying surface 332 of the current collector layer 320, the peaks 398 may have heights in the range of 5 micrometers to 100 micrometers and the valleys 300 may have depths in the range of 5 micrometers to 100 micrometers.

The laser ablation process may be performed in an oxygen-containing environment (e.g., air) to promote oxidation of the faying surface 332 of the metallic current collector layer 320 and the formation of a thin metal oxide ($Me_xO_y$) layer (not shown) on the faying surface 332 of the current collector layer 320. The metal oxide layer may have a thickness in the range of 0.1 micrometers to 10 micrometers. Oxidation of the faying surface 332 of the metallic current collector layer 320 during the laser ablation process may occur via chemical reaction between oxygen ($O_2$) in the gaseous environment surrounding the current collector layer 320 and one or more metals (e.g., Cu, Ni, Fe, and/or Ti) of the current collector layer 320. For example, oxidation of the faying surface 332 of the metallic current collector layer 320 may occur via the following chemical reaction:

$$x Me + \tfrac{1}{2} y O_2 \rightarrow Me_xO_y \qquad (1)$$

where Me is a metal element from the metallic current collector layer 320 (e.g., Cu, Ni, Fe, and/or Ti) and x and y are positive integers.

Without intended to be bound by theory, it is believed that forming the metal oxide ($Me_xO_y$) layer on the faying surface 332 of the current collector layer 320 prior to bonding the current collector layer 320 to a lithium metal layer 322 via the laser welding process may allow for the formation of both a chemical and physical bond between the current collector layer 320 and the lithium metal layer 322. More specifically, formation of the metal oxide ($Me_xO_y$) layer on the faying surface 332 of the current collector layer 320 prior to bonding the current collector layer 320 and the lithium metal layer 322 together may promote oxidation of lithium metal to lithium oxide (e.g., $Li_2O$ and/or $Li_2O_2$) on a faying surface 338 of the lithium metal layer 322 during the laser welding process. For example, the metal oxide ($Me_xO_y$) layer on the faying surface 332 of the current collector layer 320 may react with lithium metal on the faying surface 338 of the lithium metal layer 322 during the laser welding process according to one or more of the following chemical reactions:

$$Me_xO_y + 2yLi \rightarrow yLi_2O + xMe \quad (2)$$

$$2Me_xO_y + 2yLi \rightarrow yLi_2O_2 + 2xMe \quad (3)$$

where x and y are positive integers. It is believed that the formation of one or more lithium oxide compounds at a faying interface 340 of the layers 320, 322 during the laser welding process can increase the strength of a resulting weld joint 388 formed at the faying interface 340, without inhibiting the free flow of electrons between the layers 320, 322.

In one specific example, in embodiments where the current collector layer 320 comprises copper (Cu), formation of a thin copper oxide (e.g., CuO and/or $Cu_2O$) layer on the faying surface 332 of the current collector layer 320 prior to bonding the current collector layer 320 to the lithium metal layer 322 may allow for one or more of the following chemical reactions to take place between the layers 320, 322 during the laser welding process:

$$CuO + 2Li \rightarrow Li_2O + Cu \quad (4)$$

$$Cu_2O + 2Li \rightarrow Li_2O + 2Cu \quad (5)$$

$$2CuO + 2Li \rightarrow Li_2O_2 + 2Cu \quad (6)$$

$$2Cu_2O + 2Li \rightarrow Li_2O_2 + 4Cu \quad (7)$$

Figure 12:
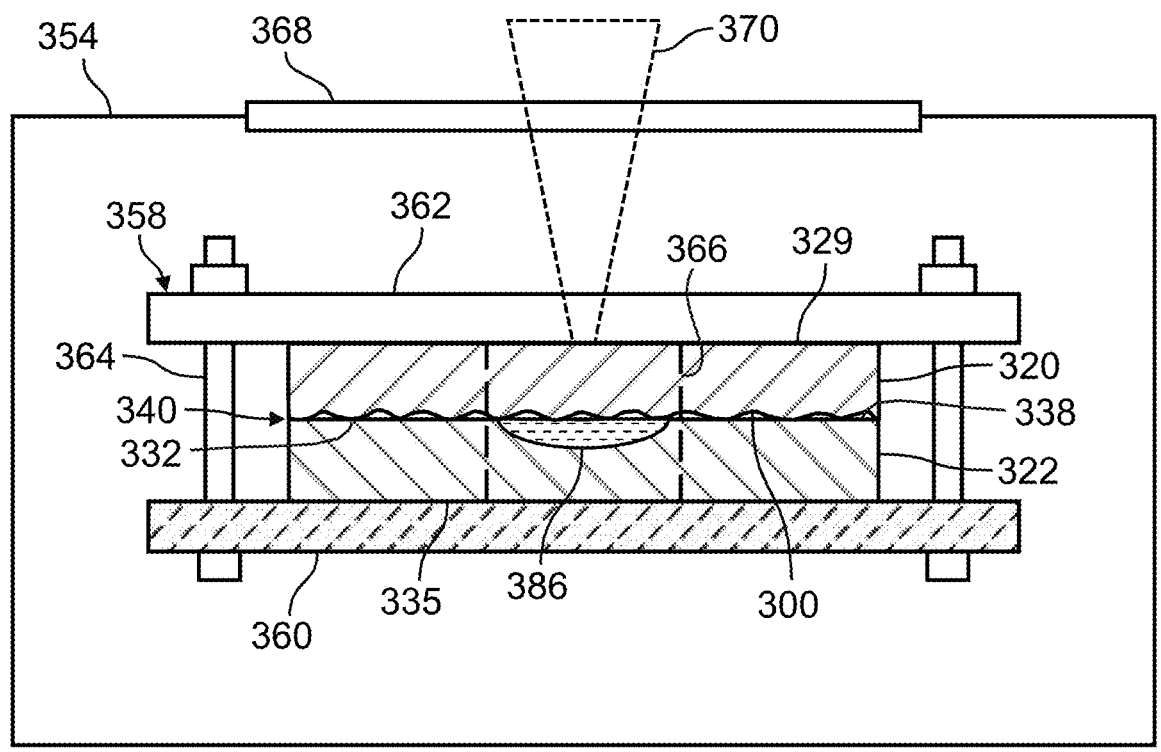
FIG. 12 is a schematic side cross-sectional view of the pretreated metallic current collector layer of FIG. 11 and a lithium metal layer during a subsequent laser welding process, wherein the current collector layer and the lithium metal layer are enclosed within a chamber, arranged in an at least partially lapped configuration, and welded together at an intended weld site.
Figure 13:
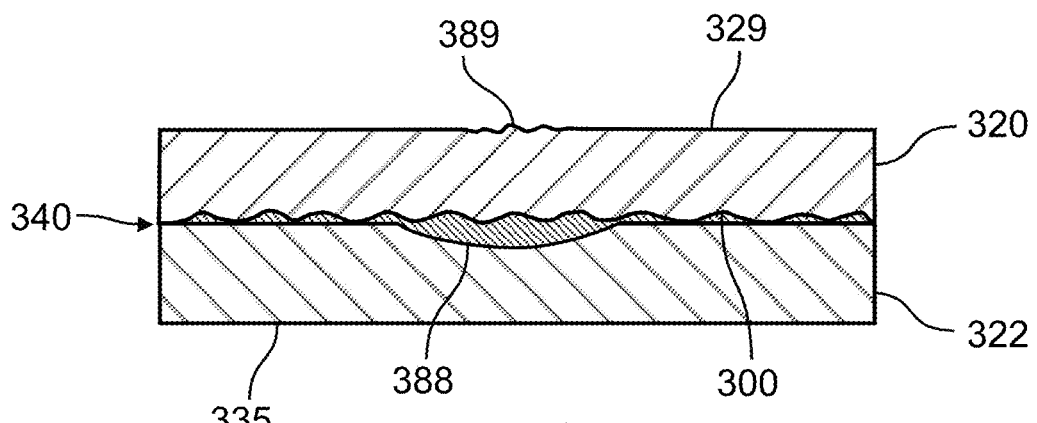
FIG. 13 is a schematic side cross-sectional view of the pretreated metallic current collector layer and the lithium metal layer of FIG. 12 after completion of the laser welding process.

After completion of the laser ablation process, the current collector layer 320 is bonded to the lithium metal layer 322 via the laser welding process. As best shown in FIGS. 12 and 13, prior to initiating the laser welding process, the current collector layer 320 and the lithium metal layer 322 are stacked one on top of the other between a support plate 360 and a transparent top plate 362 of a clamp 358. The current collector layer 320 and the lithium metal layer 322 are arranged between the support plate 360 and the top plate 362 of the clamp 358 so that the outer surface 329 of the current collector layer 320 presses against the top plate 362 and an outer surface 335 of the lithium metal layer 322 presses against the support plate 360. In addition, the faying surface 332 of the current collector layer 320 and a faying surface 338 of the lithium metal layer 322 come together to establish a faying interface 340 therebetween at an intended weld site 366. The faying surfaces 332, 338 of the layers 320, 322 are brought into intimate contact with each other at the weld site 366 by suitable adjustment of one or more adjustable arms 364, which can be used to control the distance between the plates 360, 362 and the pressure exerted on the outer surfaces 329, 335 of the respective layers 320, 322. In addition, the layers 320, 322 and the clamp 358 may be positioned within a chamber 354 and subjected to a subatmospheric pressure environment and/or an inert gas environment during the laser welding process.

After the layers 320, 322 are clamped between the plates 360, 362 and positioned within the chamber 354, a laser beam 370 is transmitted through a transparent window 368 in the chamber 354, through the top plate 362, and is directed onto the outer surface 329 of the current collector layer 320 at the weld site 366. A lithium metal molten weld pool 386 is created along the faying interface 340 of the current collector layer 320 and the lithium metal layer 322 by absorption of energy from the laser beam 370. The lithium metal molten weld pool 386 partially penetrates the lithium metal layer 322. Molten lithium metal from the molten weld pool 386 wets the faying surface 332 of the current collector layer 320, but does not melt or penetrate the faying surface 332 of the current collector layer 320. In addition, molten lithium metal from the molten weld pool 386 may flow into the valleys 300 formed in the faying surface 332 of the current collector layer 320 during the laser ablation process.

As shown in FIG. 13, when the laser beam 370 is terminated, the lithium metal molten weld pool 386 rapidly cools and solidifies into a solid weld joint 388 at the faying interface 340 of the current collector layer 320 and the lithium metal layer 322. The resulting weld joint 388 physically bonds the current collector layer 320 and the lithium metal layer 322 together at the weld site 366. In addition, in this embodiment, the solid weld joint 388 is not only formed at the faying interface 340 of the layers 320, 322, but also extends into the valleys 300 formed in the surface portion 394 of the current collector layer 320. The portions of the solid weld joint 388 that extend into the valleys 300 may create a mechanical interlock between the layers 320, 322 that effectively inhibits relative movement of the layers 320, 322 with respect to each other. For example, the portions of the solid weld joint 388 that extend into the valleys 300 of the current collector layer 320 may create a mechanical interlock between the layers 320, 322 that effectively increases the shear strength of the resulting physical bond between the layers 320, 322 by preventing the current collector layer 320 and the lithium metal layer 322 from sliding relative to each other along a plane defined by the faying surface 338 of the lithium metal layer 320. In addition, in embodiments where the laser ablation process is performed in an oxygen-containing environment, the weld joint 388 also may chemically bond the layers 320, 322 together at the weld site 366. Like the embodiments of FIGS. 2-9, after the laser beam 370 is terminated, a region 389 on the outer surface 329 of the current collector layer 320 may exhibit a relatively rough or jagged contour, as compared to the outer surface 329 of the current collector layer 320 prior to the laser welding process.

EXAMPLE

Figure 14:
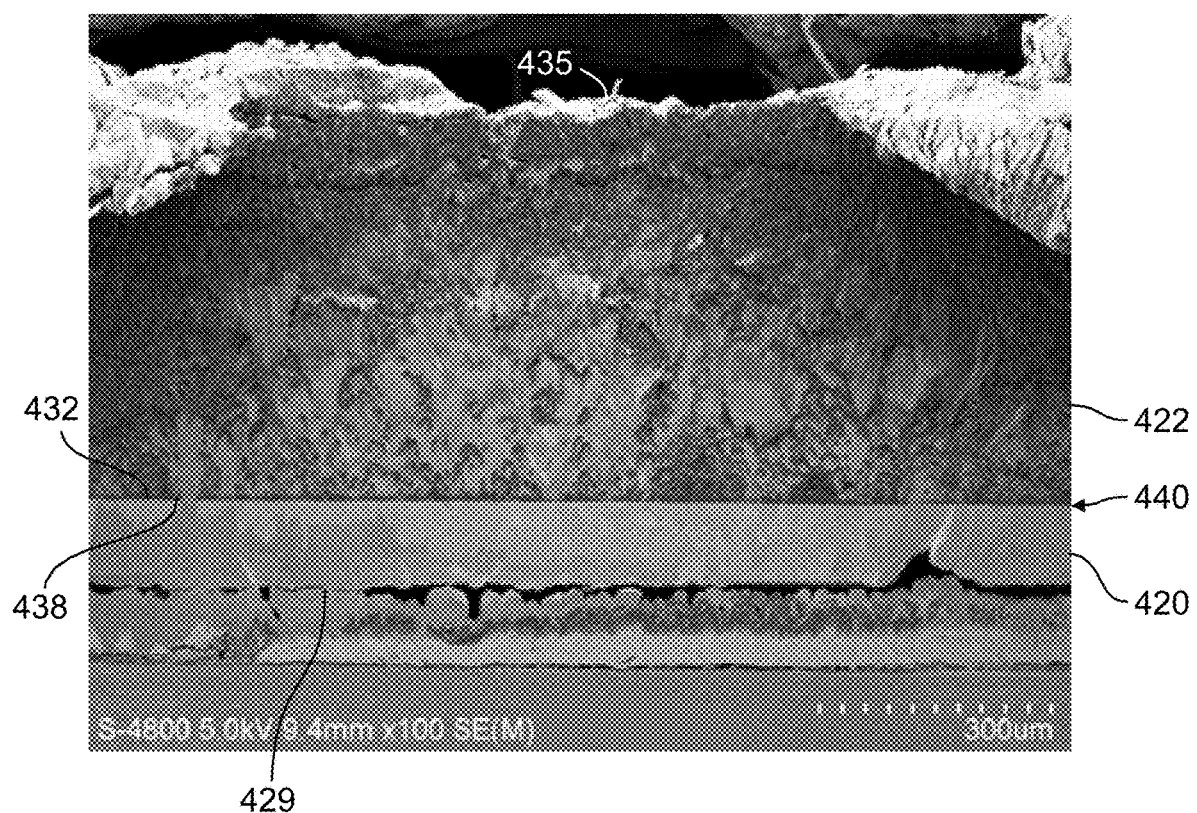
FIG. 14 is a scanning electron microscope (SEM) image of a non-porous lithium metal layer and a non-porous metallic current collector layer that have been welded together by a laser welding process, in accordance with one embodiment of the present disclosure.

Referring now to FIG. 14, a non-porous metallic current collector layer 420 and a non-porous lithium metal layer 422 were welded together along a faying interface 440 established between the layers 420, 422 using a laser welding process. The metallic current collector layer 420 exhibited a thickness of about 100 µm and was made of greater than 99% elemental nickel. The lithium metal layer 422 had a thickness of about 450 µm and was made of greater than 99% elemental lithium.

Prior to the laser welding process, the current collector layer 420 and the lithium metal layer 422 were positioned adjacent one another in a lapped configuration. In addition, the layers 420, 422 were clamped between a stainless steel support plate (not shown) and a transparent top plate (not shown) made of fused silica, with an outer surface 429 of the current collector layer 420 facing toward the transparent top plate and an outer surface 435 of the lithium metal layer 422 facing toward the support plate. Pressure was exerted on the outer surfaces 429, 435 of the layers 420, 422 by the plate so that a faying surface 432 of the current collector layer 420 and a faying surface 438 of the lithium metal layer 422 were brought into intimate contact with each other to establish a faying interface 440 therebetween at an intended weld site.

Thereafter, the layers 420, 422 were enclosed within a chamber (not shown) and welded together using a continuous wave laser beam having a power of about 300 W, a velocity of about 750 millimeters per second, and a laser beam spot size of about 300 μm. A subatmospheric pressure environment was maintained in the chamber during the laser welding process. The laser beam used to weld the layers 420, 422 together was directed through the transparent top plate and at the outer surface 429 of the current collector layer 420 so that the laser beam impinged the outer surface 429 of the current collector layer 420 at the intended weld site. Thereafter, the laser beam was controlled to track a generally straight path along a plane defined by the outer surface 429 of the layer 420 at the intended weld site.

FIG. 14 depicts an SEM image of the current collector layer 420 and the lithium metal layer 422 after completion of the laser welding process. As shown, the current collector layer 420 and the lithium metal layer 422 are joined together along a continuous zero-gap interface.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing a negative electrode for an electrochemical cell of a lithium metal battery, the method comprising:

providing a lithium metal layer having a first side that defines an outer surface and an opposite second side that defines a faying surface;

providing a metallic current collector layer having a first side that defines an outer surface and an opposite second side that defines a faying surface;

abrading the faying surface of the metallic current collector layer to produce a plurality of peaks and valleys at the faying surface of the metallic current collector layer, wherein the faying surface of the metallic current collector layer is abraded using a laser ablation process wherein a pulsed laser beam is directed at the faying surface of the current collector and advanced relative to a plane defined by the faying surface of the current collector layer in accordance with a predefined travel path, and wherein the laser ablation process is performed in an oxygen-containing environment to form a metal oxide layer on the faying surface of the metallic current collector layer;

after abrading the faying surface of the metallic current collector, arranging the lithium metal layer and the current collector layer adjacent one another and in an at least partially lapped configuration such that the faying surfaces of the layers confront one another and establish a faying interface therebetween at a weld site;

clamping the lithium metal layer and the current collector layer between a support plate and a transparent top plate such that the first side of the lithium metal layer faces toward the support plate, the first side of the current collector layer faces toward the transparent top plate, and the faying surfaces of the layers press against each other at the weld site;

directing a laser beam at the outer surface of the current collector layer at the weld site to melt a portion of the lithium metal layer adjacent the faying surface of the current collector layer and produce a lithium metal molten weld pool that wets the faying surface of the current collector layer; and terminating the laser beam to solidify the molten weld pool into a solid weld joint that physically bonds the lithium metal layer and the current collector layer together at the weld site.

2. The method of claim 1 wherein the metallic current collector layer has a relatively high melting point, as compared to that of the lithium metal layer, and wherein the molten weld pool is produced at the faying interface between the lithium metal layer and the current collector layer without penetrating or melting the faying surface of the current collector layer.

3. The method of claim 1 including:

operating the laser beam in conduction welding mode so that the lithium metal molten weld pool partially penetrates the lithium metal layer and extends from the second side of the lithium metal layer partway to the first side of the lithium metal layer.

4. The method of claim 1 wherein the metallic current collector layer comprises at least one metal or metal alloy selected from the group consisting of copper, nickel, stainless steel, and titanium.

5. The method of claim 1 wherein the metallic current collector layer comprises a non-porous metallic foil, a perforated metallic sheet, or a porous metallic mesh.

6. The method of claim 1 wherein the solid weld joint is formed between the lithium metal layer and the current collector layer without use of a flux, filler, or solder material.

7. The method of claim 1 wherein the laser beam is a continuous wave laser beam having a power density in the range of $3 \times 10^4$ W/cm$^2$ to $1 \times 10^6$ W/cm$^2$, a velocity in the range of 0.2 m/s to 2 m/s, and a laser beam spot size in the range of 0.2 mm to 1 mm.

8. The method of claim 1 including:

prior to directing the laser beam at the outer surface of the current collector layer, enclosing the lithium metal layer and the current collector layer within a chamber, and establishing a subatmospheric pressure environment within the chamber.

9. The method of claim 8 wherein the chamber includes a transparent window, and wherein the laser beam is transmitted through the transparent top plate and through the transparent window prior to being directed at the outer surface of the current collector layer.

10. The method of claim 1 wherein, when the laser beam is directed at the outer surface of the current collector layer, the lithium metal molten weld pool flows into the valleys at the faying surface of the current collector layer, and wherein, after termination of the laser beam, portions of the solid weld joint extend into the valleys at the faying surface of the current collector layer and create a mechanical interlock that inhibits sliding movement of the current collector layer and the lithium metal layer relative to each other.

11. The method of claim 1 wherein the pulsed laser beam exhibits a power density in the range of $5.0 \times 10^5$ W/cm$^2$ to $1.0 \times 10^7$ W/cm$^2$, a pulse duration in the range of 0.5 nanoseconds to 500 nanoseconds, a pulse repetition rate in the range of 1 kHz to 100 kHz, a velocity in the range of 0.1 m/s to 2 m/s, and a laser beam spot size in the range of 25 μm to 200 μm.

12. The method of claim 1 wherein, when the laser beam is directed at the outer surface of the current collector layer, the lithium metal molten weld pool chemically reacts with the metal oxide layer on the faying surface of the current collector layer to form one or more lithium oxide compounds, and wherein, after termination of the laser beam, the solid weld joint chemically and physically bonds the lithium metal layer and the current collector layer together at the weld site.

13. The method of claim 1 wherein the current collector layer is porous and includes a plurality of through-holes extending in a transverse direction relative to a plane defined by the faying surface of the current collector layer, wherein, when the laser beam is directed at the outer surface of the current collector layer, the lithium metal molten weld pool flows into the through-holes in the current collector layer, and wherein, after termination of the laser beam, portions of the solid weld joint extend into the through-holes in the current collector layer and create a mechanical interlock that inhibits sliding movement of the current collector layer and the lithium metal layer relative to each other.

14. The method of claim 13 wherein the through-holes in the current collector layer have diameters greater than or equal to 0.5 millimeters.

15. A method of manufacturing a negative electrode for an electrochemical cell of a lithium metal battery, the method comprising:
providing a metallic current collector layer having a first side that defines an outer surface and an opposite second side that defines a faying surface;
directing a pulsed laser beam at the faying surface of the metallic current collector layer while exposing the current collector layer to an oxygen-containing environment to produce a plurality of peaks and valleys at the faying surface of the current collector layer and form a thin metal oxide layer on the faying surface of the current collector layer;
providing a lithium metal layer having a first side that defines an outer surface and an opposite second side that defines a faying surface;
arranging the lithium metal layer and the metallic current collector layer adjacent one another and in an at least partially lapped configuration such that the faying surfaces of the layers confront one another and establish a faying interface therebetween at a weld site;
clamping the lithium metal layer and the current collector layer between a support plate and a transparent top plate such that the first side of the lithium metal layer faces toward the support plate, the first side of the current collector layer faces toward the transparent top plate, and the faying surfaces of the layers press against each other at the weld site;
directing a laser beam at the outer surface of the current collector layer at the weld site to melt a portion of the lithium metal layer adjacent the faying surface of the current collector layer and produce a lithium metal molten weld pool that wets the faying surface of the current collector layer, flows into the valleys at the faying surface of the current collector layer, and chemically reacts with the metal oxide layer on the faying surface of the current collector layer to form one or more lithium oxide compounds; and then
terminating the laser beam to solidify the molten weld pool into a solid weld joint that chemically and physically bonds the lithium metal layer and the current collector layer together at the weld site, wherein portions of the solid weld joint extend into the valleys at the faying surface of the current collector layer and create a mechanical interlock that inhibits movement of the current collector layer and the lithium metal layer relative to each other.

16. The method of claim 15 wherein the metallic current collector layer comprises at least one metal or metal alloy selected from the group consisting of copper, nickel, iron, and titanium, and wherein the metal oxide layer formed on the faying surface of the current collector layer comprises an oxide of the at least one metal or metal alloy of the metallic current collector layer.

17. The method of claim 15 wherein, after the plurality of peaks and valleys are produced at the faying surface of the current collector layer, the faying surface of the current collector layer exhibits a surface roughness (Rz) in the range of 10 micrometers to 500 micrometers, and wherein the metal oxide layer formed on the faying surface of the current collector layer exhibits a thickness in the range of 0.1 micrometers to 10 micrometers.

* * * * *